US006490721B1

(12) United States Patent
Gorshkov et al.

(10) Patent No.: US 6,490,721 B1
(45) Date of Patent: Dec. 3, 2002

(54) SOFTWARE DEBUGGING METHOD AND APPARATUS

(75) Inventors: Vassili Gorshkov, Centreville, VA (US); Richard Efron, Chevy Chase, MD (US); Andrew Jolyon Platt, Fairfax, VA (US); Paul William Kohlbrenner, Fairfax, VA (US)

(73) Assignee: OC Systems Incorporated, Fairfax, VA (US)

( * ) Notice: Subject to any disclaimer, the term of this patent is extended or adjusted under 35 U.S.C. 154(b) by 0 days.

(21) Appl. No.: 09/350,177

(22) Filed: Jul. 9, 1999

Related U.S. Application Data

(60) Provisional application No. 60/092,796, filed on Jul. 14, 1998.

(51) Int. Cl.⁷ ................................................ G06F 9/45
(52) U.S. Cl. ...................................... 717/130; 717/129
(58) Field of Search ................................ 717/130, 129, 717/176, 178; 703/23

(56) References Cited

U.S. PATENT DOCUMENTS

| | | | |
|---|---|---|---|
| 4,802,165 A | 1/1989 | Ream | 714/38 |
| 4,819,233 A | 4/1989 | Delucia et al. | 717/129 |
| 5,142,679 A | 8/1992 | Owaki et al. | 717/151 |
| 5,193,180 A | 3/1993 | Hastings | 717/163 |
| 5,265,254 A | 11/1993 | Blasciak et al. | 717/130 |
| 5,274,811 A | 12/1993 | Borg et al. | 717/128 |
| 5,307,498 A | 4/1994 | Eisen et al. | 717/154 |
| 5,313,616 A | 5/1994 | Cline et al. | 717/127 |
| 5,335,344 A | 8/1994 | Hastings | 714/35 |
| 5,408,650 A | 4/1995 | Arsenault | 717/124 |
| 5,465,258 A | 11/1995 | Adams | 717/130 |
| 5,499,340 A | 3/1996 | Barritz | 714/47 |
| 5,528,753 A | 6/1996 | Fortin | 714/35 |
| 5,535,329 A | 7/1996 | Hastings | 714/35 |
| 5,539,907 A | 7/1996 | Srivastava et al. | 717/130 |
| 5,581,696 A | 12/1996 | Kolawa et al. | 714/38 |
| 5,581,697 A | 12/1996 | Gramlich et al. | 714/35 |
| 5,583,988 A | 12/1996 | Crank et al. | 714/48 |
| 5,590,056 A | 12/1996 | Barritz | 702/186 |
| 5,619,678 A | 4/1997 | Yamamoto | 711/165 |
| 5,619,698 A | 4/1997 | Lillich et al. | 717/168 |
| 5,623,665 A | 4/1997 | Shimada et al. | 714/5 |
| 5,659,752 A | 8/1997 | Heisch et al. | 717/158 |
| 5,675,803 A | 10/1997 | Preisler et al. | 717/131 |
| 5,675,804 A | 10/1997 | Sidik et al. | 717/139 |
| 5,689,684 A * | 11/1997 | Mulchandani et al. | 703/23 |
| 5,694,566 A | 12/1997 | Nagae | 711/1 |
| 5,710,724 A | 1/1998 | Burrows | 714/34 |
| 5,732,273 A | 3/1998 | Srivastava et al. | 717/128 |
| 5,815,653 A * | 9/1998 | You et al. | 717/134 |
| 5,860,012 A * | 1/1999 | Luu | 709/220 |
| 6,044,224 A * | 3/2000 | Radia et al. | 709/331 |
| 6,292,934 B1 * | 9/2001 | Davidson et al. | 717/158 |
| 6,353,923 B1 * | 3/2002 | Bogle et al. | 717/128 |

OTHER PUBLICATIONS

Rational Purify; Internet website; www.rational.com; 5 pages (Oct. 8, 1999).

Bug Trapper; Internet website; www.bugtrapper.com; 4 pages (Oct. 8, 1999).

* cited by examiner

*Primary Examiner*—Gregory Morse
*Assistant Examiner*—John Q. Chavis
(74) *Attorney, Agent, or Firm*—Nixon Peabody LLP; Donald R. Studebaker

(57) ABSTRACT

A method and apparatus for debugging software for the purpose of modification of the target program's behavior and/or collection of data pertinent to a target program's execution. New user actions are compiled and converted into a dynamically linkable module. The existing program is run under the control of a dynamic action linker. The dynamic action linker modifies the existing program by inserting the new actions in the memory image. The insertion is accomplished by automatically recognizing and modifying object code sequences in the existing program to call the new actions. Once the modification phase has finished modifying the existing program's memory image the new program is run without additional interruption, the new actions acting as if they were present in the original source code for the program.

13 Claims, 4 Drawing Sheets

SOFTWARE DEBUGGING METHOD AND APPARATUS

RELATED APPLICATION DATA

This application claims benefit of Provisional Patent Application Serial No. 60/092,796, filed on Jul. 14, 1998, the disclosure of which is incorporated herein by reference.

FIELD OF THE INVENTION

The invention relates to debugging of computer code. More specifically, the invention relates to a method and apparatus for debugging computer code that does not require modification of the target executable program that is to be debugged.

DESCRIPTION OF THE RELATED ART

Computer programming has become a very complex operation because of the increased sophistication of computers and the increased complexity of tasks to be carried out by computers. Further, computer hardware is now relied upon for mission critical tasks, such as air traffic control, communications, medical equipment, and the like. It follows that computer software, i.e. a computer program, is controlling these tasks. Note that the phrase "computer program" is used herein to refer to a set of software instructions and/or routines for controlling computer hardware. The word "application" is used herein to refer to the practical use of the program, for example, inventory control, accounting or any other use.

Of course, a higher level of software complexity results in a higher potential for programming errors, known as "bugs". For example, many programs consist of thousands or even millions of lines of code. The sheer volume of code creates great potential for bugs. Also, as a result of the size of most computer programs, the code often is developed by plural teams of programmers each working on a different portion or aspect of the program. The teams may accomplish similar tasks in a different manner or otherwise produce code that is incompatible with code developed by other teams. Due to the huge reliance on computer software in just about every aspect of society, it is important to find and eliminate as many bugs as possible in an efficient manner. Also, it is often desirable to insure the performance of a computer program. For example, the end user may want to be guaranteed that a particular variable is updated very quickly.

To find errors in code and assure performance, a process called "debugging" has developed. One form of conventional debugging is called "interactive debugging". Interactive debugging includes stopping the program at desired break points, known as "breaks", for examination of program status. "Noninteractive debugging" does not stop the program. However it uses debugging statements which are inserted into the source code and the source code is then compiled into machine code including the debugging statements. Once all errors have been eliminated and the program is operating in a desirable manner, the debugging statements are removed from the source code and the program is recompiled and used for its intended task.

Conventional debugging techniques, while sometimes effective, have several shortcomings. In particular, conventional noninteractive debugging techniques require access to the source code for insertion of the debugging statements. Often, the user license for a particular program does not grant access to the source code or the right to change the source code. Therefore, in most cases, the user must rely on the developer of the software to provide all debugging. Often programming errors occur only in a particular application of a program and thus are not caught by the developer during initial debugging. Also, the developer may be unavailable or unwilling to provide subsequent debugging services. Further, even if access to the source code is not an obstacle, the program as run during noninteractive debugging has been altered to accommodate the debugging statements. Therefore, the program might not run in the same manner during debugging as it will during normal operation. The debugging statements may mask errors, create errors, slow operation, or otherwise affect the function or performance of the program. Finally, many programs behave differently or even refuse to run when stopped. Therefore, conventional interactive debugging using break points is not reliable and is difficult to implement.

SUMMARY OF THE INVENTION

It is an object of the invention to overcome the limitations of conventional debugging techniques.

It is another object of the invention to permit debugging of a computer program without stopping execution of the program.

It is another object of the invention to permit noninteractive debugging of a computer program without accessing or altering the source code of the program.

It is another object of the invention to conduct performance testing of a computer program under actual executable conditions of the program.

It is another object of the invention to conduct requirement verification under actual executable conditions of the program.

It is another object of the invention to increase the speed and efficiency of software development.

It is another object of the invention to facilitate software comprehension.

The invention uses "dynamic linking" to use the existing target program executable for debugging and thus avoids the long edit-compile-link cycles inherent in the use of debugging statements in source code. By linking new user actions into the executable image, the target program is allowed to run as it would normally run thus allowing debugging of time sensitive programs without the need to stop execution thereof. Calls to the user actions are inserted into the memory image during loading of the target program. The calls can be inserted at any time during or after transfer of the executable code into memory. Accordingly, the term "loading" as used herein refers to any time during or after transfer of the target program into memory for the purpose of running the program. The invention can be used to locate and fix programming errors, for requirements verification, for performance evaluation, for software comprehension, or for any other evaluation of software. Accordingly, the term "debugging" as used herein refers broadly to any type of diagnosis or evaluation of software.

A first aspect of the invention is a method for debugging a computer program comprising the steps of developing a debugging subprogram having a user action for debugging a target program, loading the target program for execution, inserting a call to the debugging subprogram into a memory image of the target program during the loading step, and executing the target program.

A second aspect of the invention is a computer readable medium having instructions for debugging a computer program recorded thereon. The medium a includes a first set of instructions for loading the target program for execution, and a second set of instructions for inserting a call to a debugging subprogram having user actions into a memory image of the target program during loading of the target program.

BRIEF DESCRIPTION OF THE DRAWING

The invention is described through a preferred embodiment and the attached drawing in which.

DETAILED DESCRIPTION OF THE PREFERRED EMBODIMENT

Figure 1:
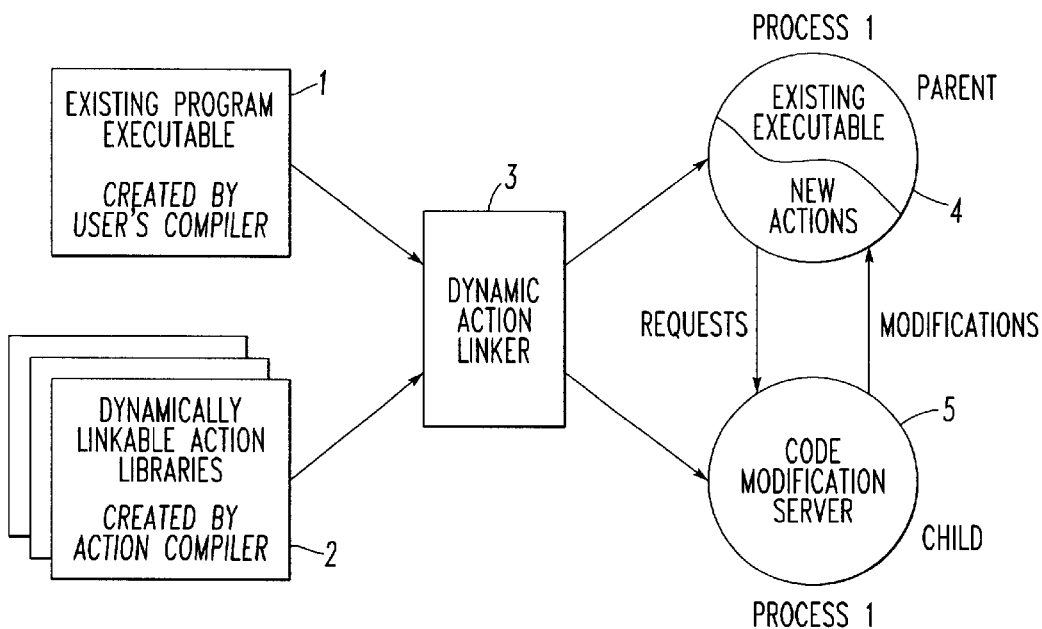
FIG. 1 is a schematic diagram illustrating the primary components of a preferred embodiment of the invention.

FIG. 1 illustrates the primary components of the preferred embodiment. Target program 10 is the existing program in executable format that is to be debugged. Target program 10 is a machine code executable file that has been compiled from source code in a known manner using a known software compiler. User action libraries 12 are created by compiling one or more debugging subprograms 16 (containing user actions) into linkable libraries (similar to Dynamic Link Libraries (DLL) in a Windows™ environment). This compiling procedure is accomplished by action compiler 14 which compiles the source code of subprograms 16, which are written in ANSI C for example, into machine code of user action libraries 12. These files together with target program 10 are input to dynamic action linker 18. Note that there can be multiple user action libraries 12, including a runtime library.

Dynamic action linker 18 reads target program 10 and user action libraries 12 and creates two processes. A first process 20 created by dynamic action linker 18 consists of target program 10 and the debugging user actions needed from user action libraries 12. A second process 22 created by dynamic action linker 18 handles requests from process 20, to modify code locations in process 20 as described in detail below. Action compiler 14 and dynamic action linker 18 can be recorded as instructions on a computer readable medium.

Figure 2:
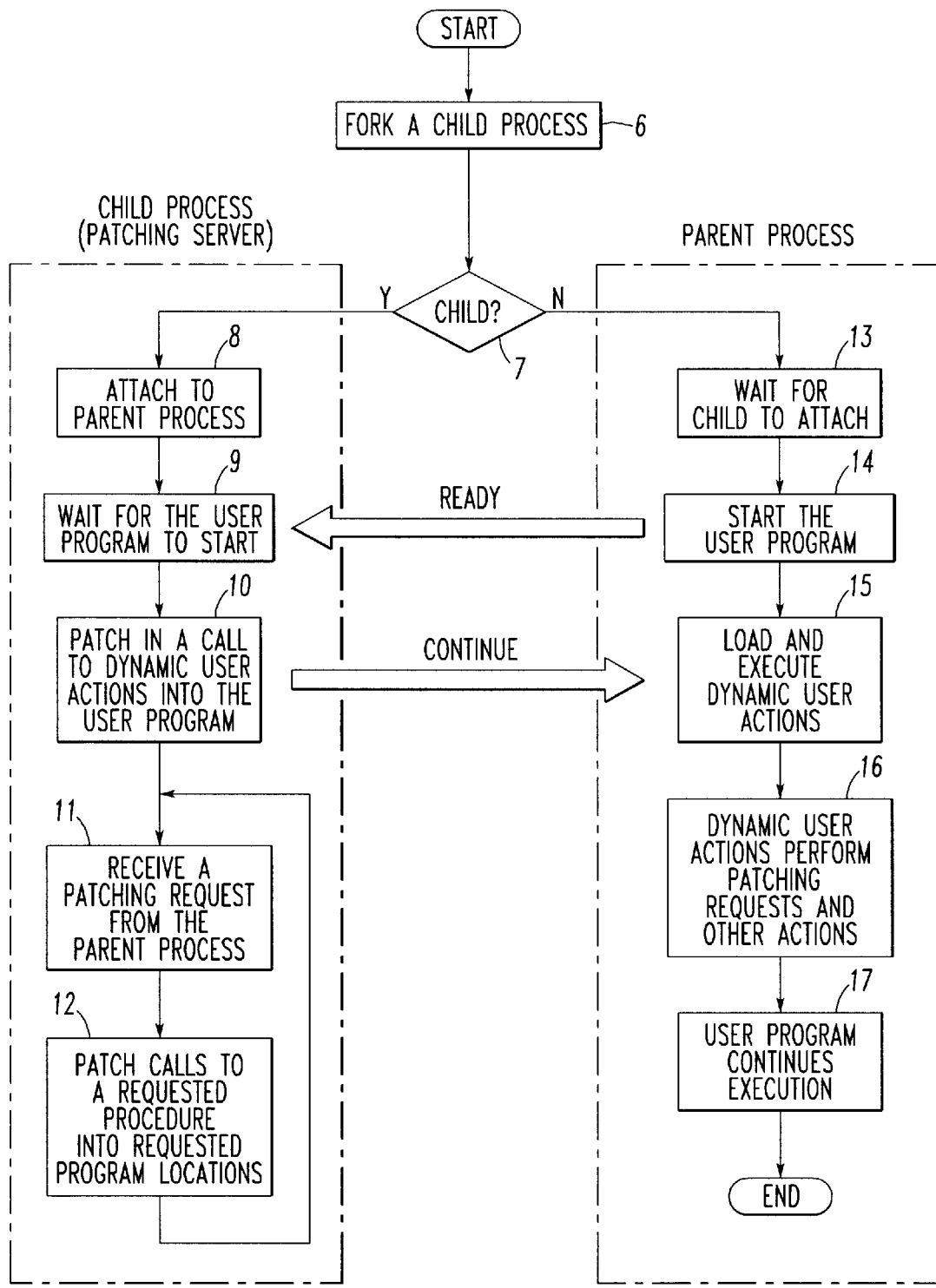
FIG. 2 is a flow chart illustrating the operation of the dynamic action linker in accordance with the preferred embodiment.

FIG. 2 illustrates the operation of dynamic action linker 18. In step A, dynamic action linker 18 forks a child process to create a parent process which corresponds to process 20 disclosed above and a child process which corresponds to process 22 above. The fork system code is a well known service supported by most operating systems in which a copy known as a "child" is made of parent program in RAM. Child process 22 allows attachments of debugging commands. In step B, both parent process 20 and child process 22 identify themselves and the execution path splits. Child process 22 then attempts to attach to parent process 20 using known available operating system services in step C. Child process 22 waits for an acknowledgment from parent process 20 that it has successfully attached in step D. In step E, child process 22 has received the acknowledgment from parent process 20 of a successful attachment and continues on to patch into parent process 40 a call to the dynamic user actions runtime start routines, i.e. the debugging actions. In particular, calls to user actions in user action libraries 12 are inserted in the memory image of target program 10 (which is running as will be seen below) and user action libraries 12 are loaded into RAM in a separate area. In step F, child process 22 waits for a new request for patching service from parent process 20. In step G, child process 22 has received a request from parent process 20 and executed the request. Steps F and G are repeated until the task is terminated by parent process 20.

Of course, parent process 20 runs simultaneously with steps C–G of child process 22. In step H, parent process 20 waits until child process 22 has attached to parent process 20 using the operating system debug facility. In step I, parent process 20 loads the user program, i.e. replaces the current memory image with target program 10 in a known manner. Since child process 22 has control of parent process 20, the operating system loads target program 10 and holds parent process 20 while it notifies child process 22. Child process 22 patches, in step E, in such a way that it will load and branch dynamic user actions to target program 10 in step J. The patched target program 10 then continues to run in step K with the new dynamic user actions from user action libraries 12. After completing the patched user actions, target program 10 continues executing in step L.

Figure 3:
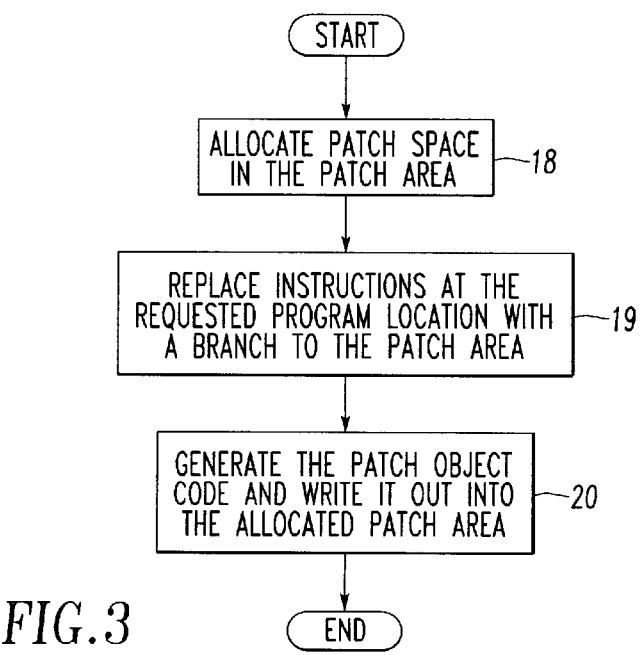
FIG. 3 is a flow chart illustrating the steps performed to patch a call into the target program.

FIG. 3 illustrates Step E of FIG. 2, i.e., patching of dynamic user actions into target program 10 in detail. Child process 22 created by dynamic action linker 18 must patch the memory image of target program 10 so that it will call the newly loaded user action routines. In step E1, child process 22 allocates space for the patch in the patch area in parent process 20. In step E2, child process 22 replaces an instruction (or instructions) at the requested program location with a branch instruction to the patch area. In step E3, child process 22 generates code to call the user action.

Figure 4:
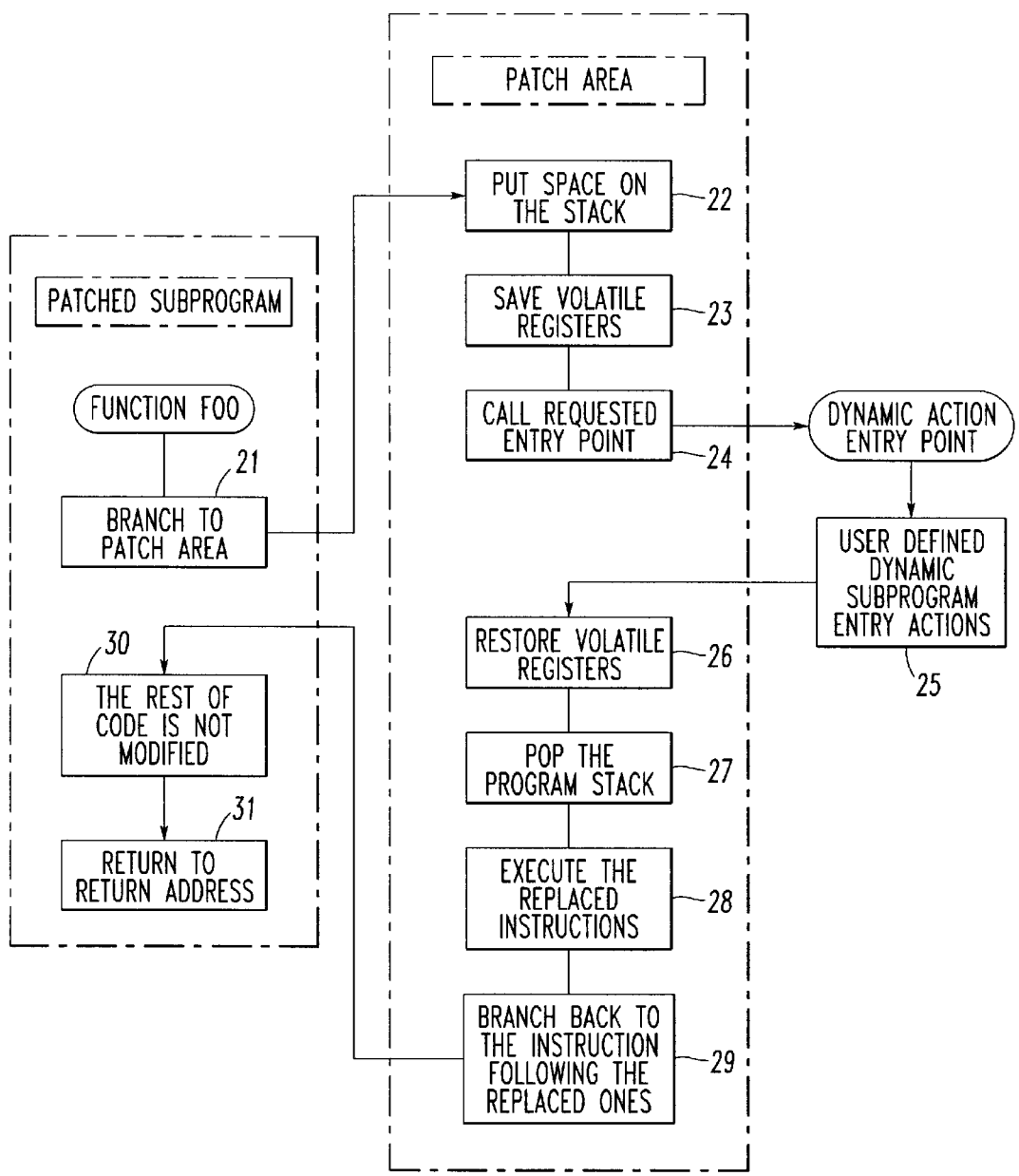
FIG. 4 is a flow chart illustrating the steps performed to patch code into the parent process by the child process in accordance with the preferred embodiment.

FIG. 4 illustrates the function of the code patched into the parent process 20 by child process 22. In step M, a subroutine of target program 10 begins. In step AB, a subroutine call placed in the subroutine branches to patch area 42. In patch area 42, code to do the following actions has been written: allocate space on the patch stack (AC), save any registers to the patch stack (AD), call the dynamic user action routine (AE) enter the dynamic user action (AF), execute the dynamic user action and return to the patch area (AG), restore any saved registers from the patch stack (AH), return the space allocated from the patch stack (AI), execute the instruction or instructions that were removed from the subroutine entry sequence (AJ), and return to subroutine (AK). In step AL remaining code is executed and execution is returned to the caller of the subroutine in step AM.

Figure 5:
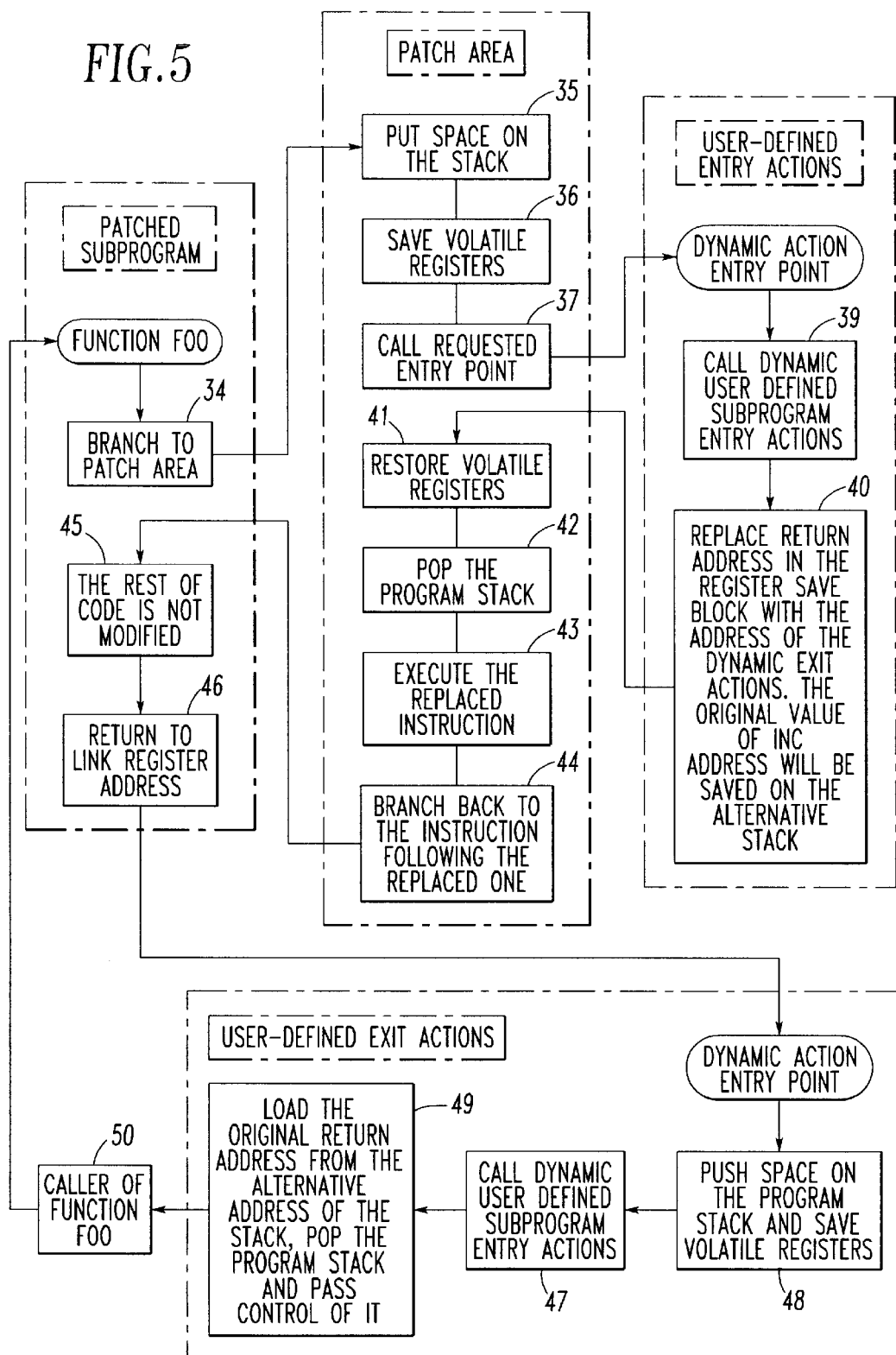
FIG. 5 is a flow chart illustrating the steps performed to patch code into the parent process by the child process when user actions are requested for entry and exit of a routine in accordance with the preferred embodiment.

FIG. 5 illustrates the function of parent process 20 and the child process 22 when user actions have been requested for the exit as well as the entry to a routine. In step BA, a subroutine begins. In step BB, a call has been inserted in the subroutine and thus it branches into patch area 42. In patch area 42, code to do the following actions has been written: allocate spaced on the patch stack (BC), save any registers to the patch stack (BD), enter the user action (BF), call the user action routine (BE), execute the user action and return to the patch area (BG), replace the subroutine's return location with dynamic exit action patch routine (BH), restore any saved registers from the patch stack (BI), return the space allocated from the patch stack (BJ), execute the instruction or instructions that were removed from the subroutine entry sequence (BK), and return to subroutine (BL). In step BM, the rest of the subroutine is executed. In step BN execution returns to the dynamic exit action routing (BN). A user action also begins in step (BO). Space on the patch stack is allocated and any registers are saved to the patch stack in step BP. The dynamic user action is executed in step BQ. The saved registers are restored and the space allocated on the patch stack is returned in step BR. In step BQ execution returns to the caller of the subroutine in step BJ.

The various components and functions described above can be in the form of computer software running on a computer such as a standard personal computer or a server. The software can be written with known programming languages and stored on known media. For example, magnetic media, such as a removable diskette or a hard drive can be used. Also, the software can be stored on optical media, such as CDROM. Alternatively, any computer readable medium can be used to store the software of the preferred embodiment. The invention has been described through a preferred embodiment. However, various modifications can be made without departing from the scope of the invention and defined by the appended claims.

The invention allows the exact executable that will be shipped to a customer to be tested/verified. The invention can be used for subprogram call tracing, logging subprogram calls and parameter values, performance measurements, memory usage tracking and detections of memory violations, fault injection, test coverage, component testing, program and data verification, and requirements verification.

What is claimed is:

1. A method for debugging a computer program comprising the steps of:

developing a debugging subprogram having a user action for debugging a target program;

loading the target program for execution;

inserting a call to the debugging subprogram into a memory image of the target program during said loading step; and executing the target program with the call inserted therein.

2. A method as recited in claim 1, wherein said developing step comprises the steps of:

preparing source code of a debugging routine: and compiling the source code of the debugging routine into the debugging subprogram.

3. A method as recited in claim 2, wherein said inserting step comprises the steps of:

allocating patch space in the debugging subprogram;

replacing instructions of the debugging subprogram with a branch to the patch space; and generating object code to call the user action.

4. A method as recited in claim 1, wherein said step of executing the target program comprises the steps of:

executing the debugging subprogram when the call to the debugging subprogram is encountered in the target program; and returning to execution of the target program after said step of executing the debugging subprogram.

5. A method as recited in claim 1, wherein said step of executing the target program comprises the steps of:

forking a child process of the debugging subprogram; and loading the target program with the parent process of the debugging subprogram.

6. A method as recited in claim 5, wherein said step of inserting comprises patching a call to a dynamic user action into the target program with the child process.

7. A method as recited in claim 2, wherein said preparing step comprises inserting a user action into the source code to reference entities of the target program.

8. A method as recited in claim 7, wherein said entities comprise at least one of variables, functions, expressions and objects declared in the target program.

9. A computer readable medium having instructions for debugging a computer program recorded thereon, said medium comprising:

a first set of instructions for inserting a call to a debugging subprogram containing a user action into a memory image of the target program during loading of the target program; and a second set of instructions for executing the target program with the call inserted therein.

10. A medium as recited in claim 9, wherein said first set of instructions comprises:

instructions for allocating patch space in the debugging subprogram;

instructions for replacing instructions of the debugging subprogram with a branch to the patch space; and instructions for generating patch object code to call the user action.

11. A medium as recited in claim 9, wherein said second set of instructions comprises:

instructions for executing the debugging subprogram when the call to the debugging subprogram is encountered in the target program; and instructions for returning to execution of the target program after executing the debugging subprogram.

12. A medium as recited in claim 9, wherein said second set of instructions further comprises:

instructions for forking child process of the debugging subprogram; and instructions for loading the target program with the parent process of the debugging subprogram.

13. A medium as recited in claim 12, wherein said first set of instructions further comprises instructions for patching a call to a dynamic user action into the target program with the child process.

* * * * *